(12) United States Patent
Serkh (10) Patent No.: US 9,169,914 B2
(45) Date of Patent: Oct. 27, 2015

(54) ISOLATING DECOUPLER

(71) Applicant: THE GATES CORPORATION, Denver, CO (US)

(72) Inventor: Alexander Serkh, Troy, MI (US)

(73) Assignee: GATES CORPORATION, Denver, CO (US)

( * ) Notice: Subject to any disclaimer, the term of this patent is extended or adjusted under 35 U.S.C. 154(b) by 116 days.

(21) Appl. No.: 14/201,510

(22) Filed: Mar. 7, 2014

(65) Prior Publication Data

US 2015/0252884 A1     Sep. 10, 2015

(51) Int. Cl.
| | |
|---|---|
| *F16D 3/00* | (2006.01) |
| *F16H 55/14* | (2006.01) |
| *F16H 55/36* | (2006.01) |
| *F16D 41/20* | (2006.01) |
| *F02B 67/06* | (2006.01) |

(52) U.S. Cl.
CPC ............... *F16H 55/36* (2013.01); *F02B 67/06* (2013.01); *F16D 41/206* (2013.01); *F16D 2300/08* (2013.01); *F16H 2055/366* (2013.01)

(58) Field of Classification Search
CPC . F16H 55/36; F16H 2055/366; F16D 41/206; F16D 7/022; F16D 3/12
USPC .................................................. 474/94, 74, 70
See application file for complete search history.

(56) References Cited

U.S. PATENT DOCUMENTS

| | | | | | |
|---|---|---|---|---|---|
| 4,713,042 | A | * | 12/1987 | Imhoff | 474/69 |
| 5,087,057 | A | * | 2/1992 | Kurkowski | 277/497 |
| 5,139,463 | A | * | 8/1992 | Bytzek et al. | 474/69 |
| 6,074,184 | A | * | 6/2000 | Imai | 418/54 |
| 6,083,130 | A | * | 7/2000 | Mevissen et al. | 474/70 |
| 6,394,248 | B1 | * | 5/2002 | Monahan et al. | 192/41 S |
| 6,761,656 | B2 | * | 7/2004 | King et al. | 474/74 |
| 7,153,227 | B2 | * | 12/2006 | Dell et al. | 474/70 |
| 7,207,910 | B2 | * | 4/2007 | Dell et al. | 474/74 |
| 7,392,988 | B2 | * | 7/2008 | Moldt et al. | 277/429 |
| 7,591,357 | B2 | * | 9/2009 | Antchak et al. | 192/55.5 |
| 7,712,592 | B2 | * | 5/2010 | Jansen et al. | 192/41 S |
| 7,766,774 | B2 | * | 8/2010 | Antchak et al. | 474/74 |
| 7,892,124 | B2 | * | 2/2011 | Hodjat et al. | 474/94 |
| 8,021,253 | B2 | * | 9/2011 | Dell et al. | 474/74 |
| 8,302,753 | B2 | * | 11/2012 | Antchak et al. | 192/55.5 |
| 8,419,574 | B2 | * | 4/2013 | Serkh et al. | 474/94 |

(Continued)

FOREIGN PATENT DOCUMENTS

DE     102011122782 A1     11/2012

OTHER PUBLICATIONS

European Patent Office, International Search Report Application No. PCT/US2015/016138, Mailing date Jul. 8, 2015.

*Primary Examiner* — Henry Liu
(74) *Attorney, Agent, or Firm* — Jeffrey A. Thurnau, Esq.; Paul N. Dunlap, Esq.

(57) ABSTRACT

An isolator decoupler comprising a shaft, a pulley journalled to the shaft, a torsion spring engaged between the pulley and a carrier, the torsion spring loaded in an unwinding direction, the carrier engaged with a first spring ring, the first spring ring engaged in series with a second spring ring, the second spring ring engaged in series with a wrap spring, the wrap spring frictionally engagable with a shaft surface, the first spring ring, the second spring ring and wrap spring each loaded in an unwinding direction, and a sealing member radially expands under acceleration to sealingly engage the pulley, the sealing member engaged with the shaft when not under acceleration.

20 Claims, 7 Drawing Sheets

(56) References Cited

U.S. PATENT DOCUMENTS

| | | | |
|---|---|---|---|
| 8,506,434 B2* | 8/2013 | Harvey | 474/94 |
| 8,534,438 B2* | 9/2013 | Antchak et al. | 192/55.5 |
| 8,602,928 B2* | 12/2013 | Serkh et al. | 474/70 |
| 8,678,157 B2* | 3/2014 | Ward et al. | 192/55.1 |
| 8,820,503 B2* | 9/2014 | Schneider et al. | 192/55.5 |
| 8,888,619 B2* | 11/2014 | Antchak et al. | 474/74 |
| 8,888,622 B2* | 11/2014 | Chen et al. | 474/94 |
| 8,931,610 B2* | 1/2015 | Serkh | 192/55.5 |
| 8,951,153 B2* | 2/2015 | Ishida et al. | 474/94 |
| 8,985,293 B2* | 3/2015 | Marion et al. | 192/55.5 |
| 9,033,832 B1* | 5/2015 | Serkh et al. | 474/70 |
| 2004/0014540 A1* | 1/2004 | Dell et al. | 474/70 |
| 2006/0025257 A1* | 2/2006 | Tanabe et al. | 474/199 |
| 2006/0264280 A1* | 11/2006 | Dell et al. | 474/70 |
| 2010/0116617 A1* | 5/2010 | Serkh et al. | 192/41 S |
| 2011/0065537 A1* | 3/2011 | Serkh et al. | 474/94 |
| 2011/0245000 A1* | 10/2011 | Serkh et al. | 474/94 |
| 2011/0256968 A1* | 10/2011 | Serkh et al. | 474/70 |
| 2012/0015768 A1* | 1/2012 | Serkh et al. | 474/94 |
| 2012/0088616 A1* | 4/2012 | Ali et al. | 474/94 |
| 2013/0150191 A1* | 6/2013 | Ishida | 474/94 |
| 2013/0217524 A1* | 8/2013 | Antchak et al. | 474/94 |
| 2013/0233670 A1* | 9/2013 | Ward et al. | 192/41 S |
| 2013/0324335 A1* | 12/2013 | Chen et al. | 474/94 |

* cited by examiner

ISOLATING DECOUPLER

FIELD OF THE INVENTION

The invention relates to an isolating decoupler, and more particularly, to an isolating decoupler comprising a sealing member that radially expands under acceleration to sealingly contact the pulley.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 8,534,438 which discloses a decoupler with driven and driving members, a clutch, a torsional vibration damper and a lubricant. The clutch is received in a bore in the driven member and includes a carrier, a wrap spring and at least one spring. The wrap spring is formed of spring wire and has a plurality of coils disposed between a first end, which is received in a groove in the carrier, and a second end. The portion of the wrap spring outside the carrier has an outer circumferential spring surface that is abutted against the inner circumferential surface of the bore. The at least one spring is disposed between the carrier and the driving member to transmit rotary power from the driving member to the carrier. The torsional vibration damper is coupled to the driving member for rotation therewith. The lubricant is disposed on the remaining portion of the wrap spring.

What is needed is an isolating decoupler comprising a sealing member that radially expands under acceleration to sealingly contact the pulley. The present invention meets this need.

SUMMARY OF THE INVENTION

The primary aspect of the invention is an isolating decoupler comprising a sealing member that radially expands under acceleration to sealingly contact the pulley.

Other aspects of the invention will be pointed out or made obvious by the following description of the invention and the accompanying drawings.

The invention comprises an isolator decoupler comprising a shaft, a pulley journalled to the shaft, a torsion spring engaged between the pulley and a carrier, the torsion spring loaded in an unwinding direction, the carrier engaged with a first spring ring, the first spring ring engaged in series with a second spring ring, the second spring ring engaged in series with a wrap spring, the wrap spring frictionally engagable with a shaft surface, the first spring ring, the second spring ring and wrap spring each loaded in an unwinding direction, and a sealing member radially expands under acceleration to sealingly engage the pulley, the sealing member engaged with the shaft when not under acceleration.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
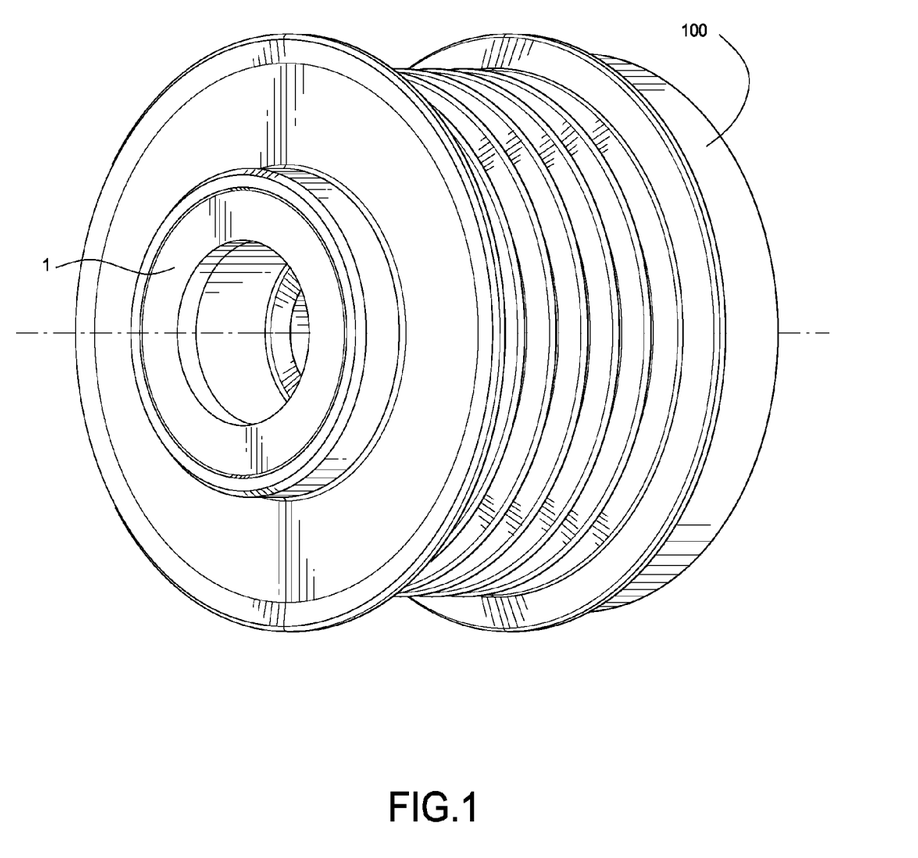
FIG. 1 is a perspective view of the device.
Figure 2:
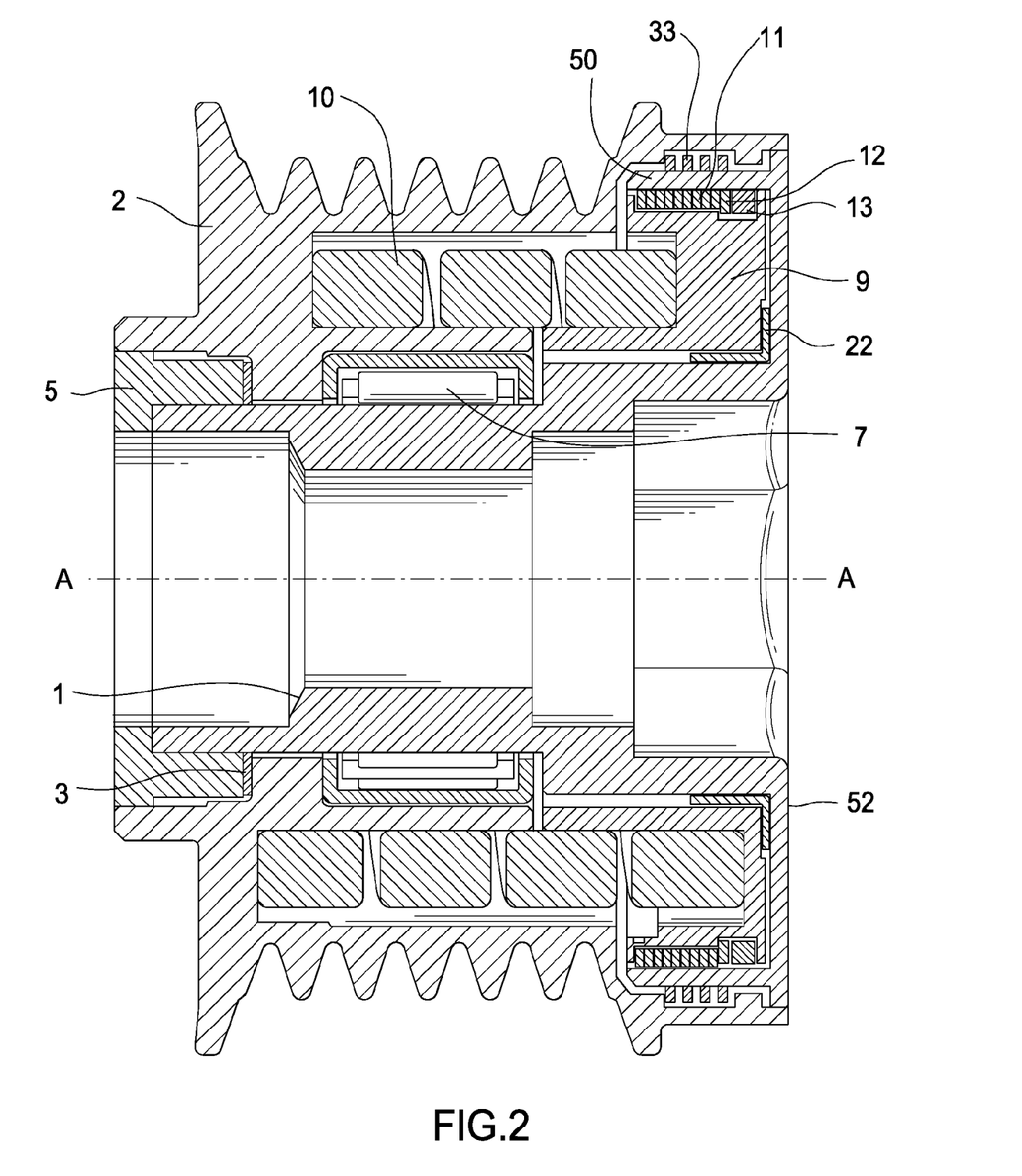
FIG. 2 is a cross-section view of the device.
Figure 3:
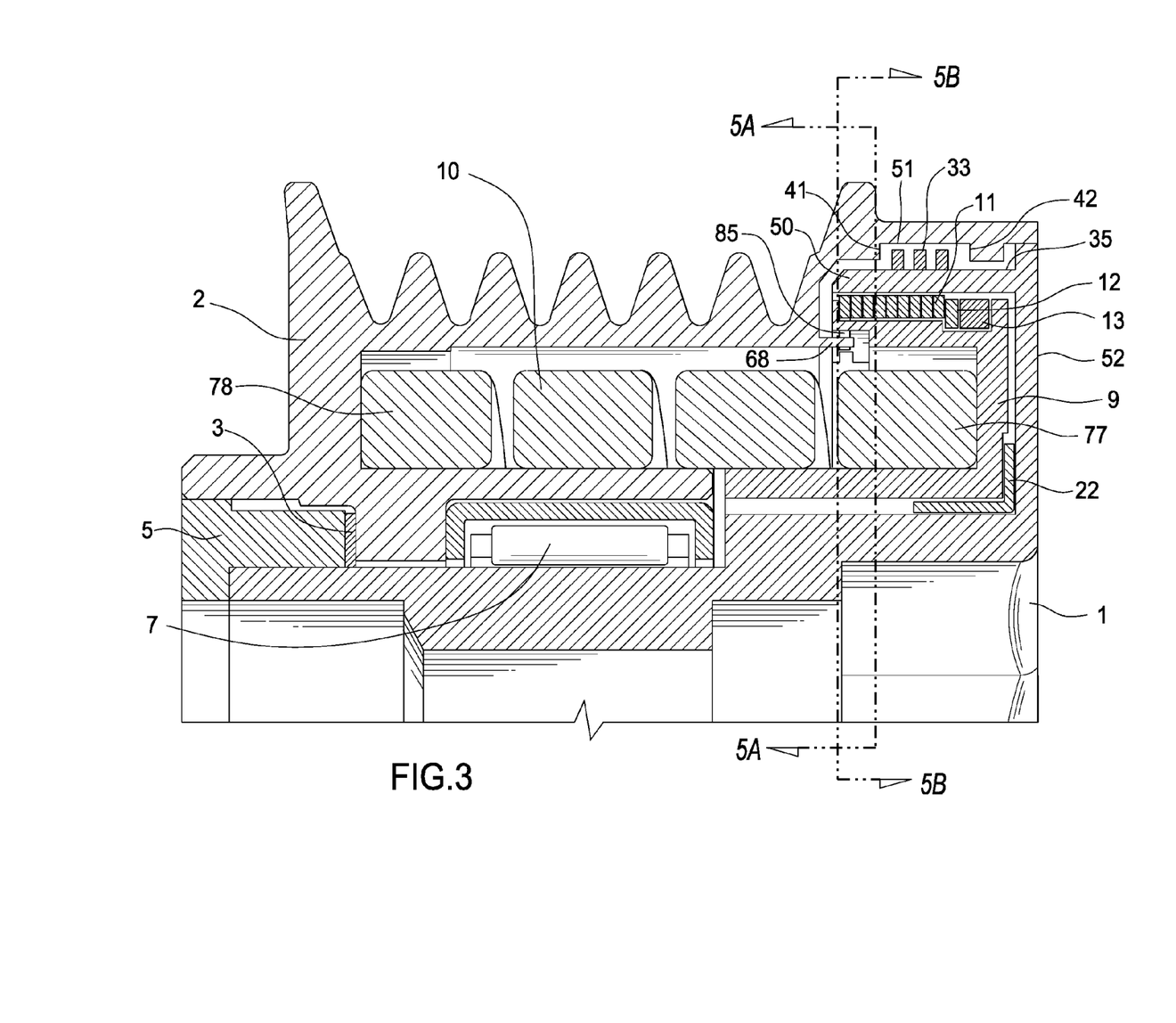
FIG. 3 is a detail of the cross-section view of the device.
Figure 4:
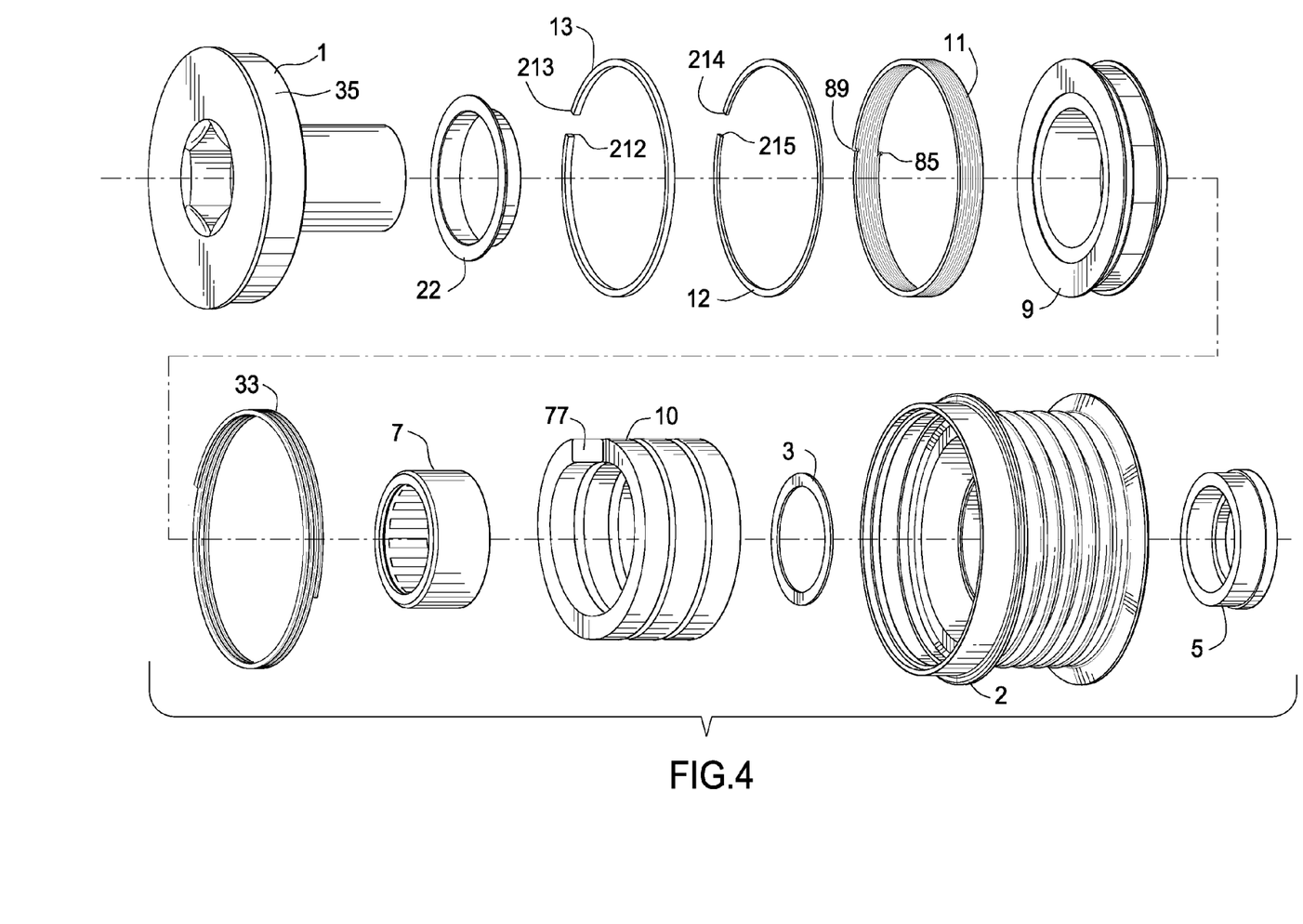
FIG. 4 is an exploded view of the device.

FIG. 1 is a perspective view of the device. FIG. 2 is a cross-section view of the device. Isolating decoupler 100 comprises a pulley 2 journalled to shaft 1 on a bearing 7. An end 78 of torsion spring 10 engages pulley 2. The other end 77 of torsion spring 10 engages carrier 9 at portion 770. Torsion spring 10 is loaded in the unwinding direction.

Pulley 2 is retained on shaft 1 between end cap 5 and end portion 52. Thrust washer 3 is disposed between end cap 5 and pulley 2. Carrier 9 bears upon bushing 22. Bushing 22 engages end portion 52. Wrap spring 11 frictionally engages an inner surface of shaft portion 50. Spring ring 12 engages spring ring 13 in series, which engages wrap spring 11 in series.

End cap 5 locates the isolating decoupler 100 axially with respect to a driven load, for example, an alternator (not shown). Dynamic seal 33 is disposed between pulley 2 and shaft portion 50.

Torque is transmitted from the pulley 2 through torsion spring 10, through one-way clutch assembly 500 to shaft 1. One-way clutch assembly 500 comprises carrier 9, spring ring 13, spring ring 12 and wrap spring 11.

Carrier 9 contacts end 77 of torsion spring 10 at the contact point 770. Wrap spring 11, spring ring 12 and spring ring 13 are installed in carrier 9. Wrap spring 11 and has two ends. The first end 85 is torque limiting and end 89 is torque receiving.

Wrap spring 11 transmits torque by frictional engagement caused by outward expansion of wrap spring 11 into shaft surface 53. Wrap spring 11 is loaded in the unwinding direction. Wrap spring 11 is disposed radially inward of the shaft surface 53. The radially outward expansion of wrap spring 11 is caused by the load imparted from pulley 2, through torsion spring 10 through carrier 9, through spring ring 13 and spring ring 12, each in series. In the at-rest position wrap spring 11 has a light drag engagement with shaft surface 53.

Figure 5A:
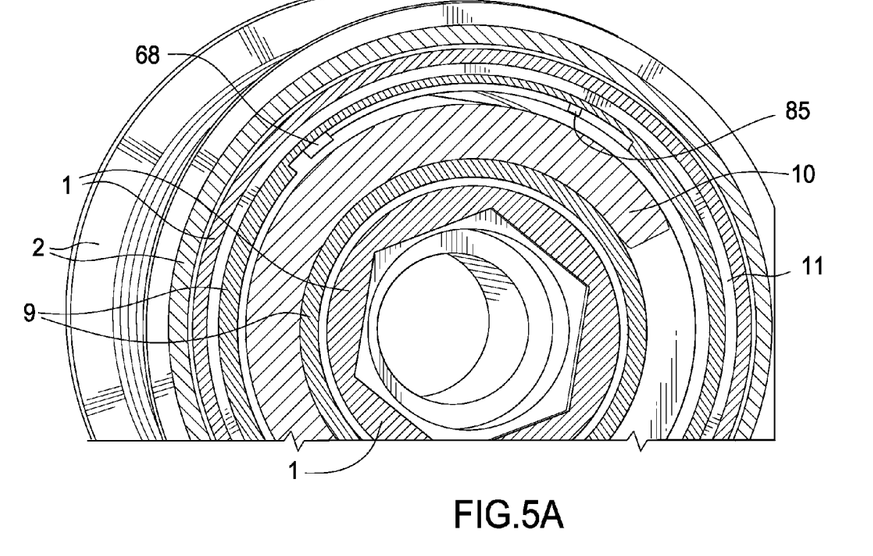
FIG. 5A is a detail of the over-torque release.
Figure 5B:
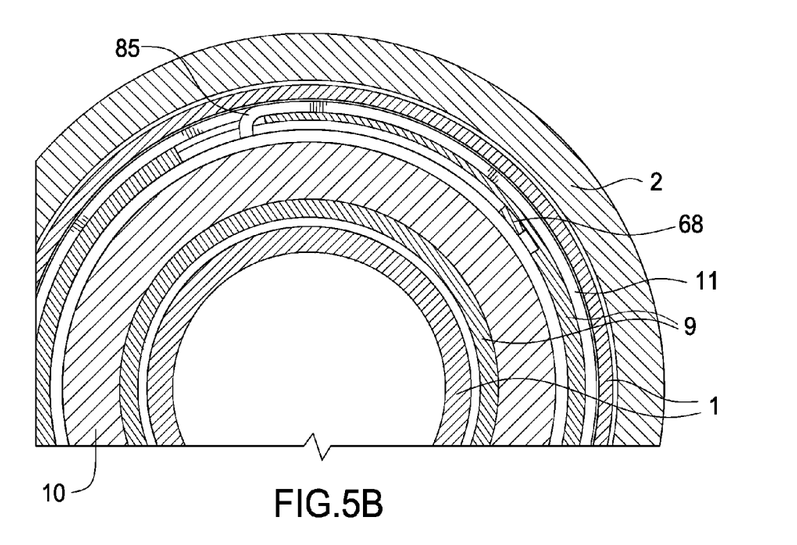
FIG. 5B is a detail of the over-torque release.

FIG. 5A is a detail of the over-torque release. FIG. 5B is a detail of the over-torque release. In normal operation end 85 of wrap spring 11 does not come into contact with pulley 2. As the torque input through pulley 2 to the device increases the relative distance between tab 68 of pulley 2 with respect to end 85 decreases. Once contact occurs at a predetermined torque input the contact between tab 68 and end 85 will cause wrap spring 11 to progressively disengage from shaft surface 53 thereby allowing pulley 2 to "slip" past shaft 1. This is because a further relative movement of tab 68 causes wrap spring 11 to move in the winding direction, which decreases the diameter of wrap spring 11, thereby progressively disengaging wrap spring 11 from shaft surface 53 whereby the magnitude of the frictional engagement between the wrap spring and the shaft is progressively reduced. This release function protects the device from an over-torque situation.

Figure 6A:
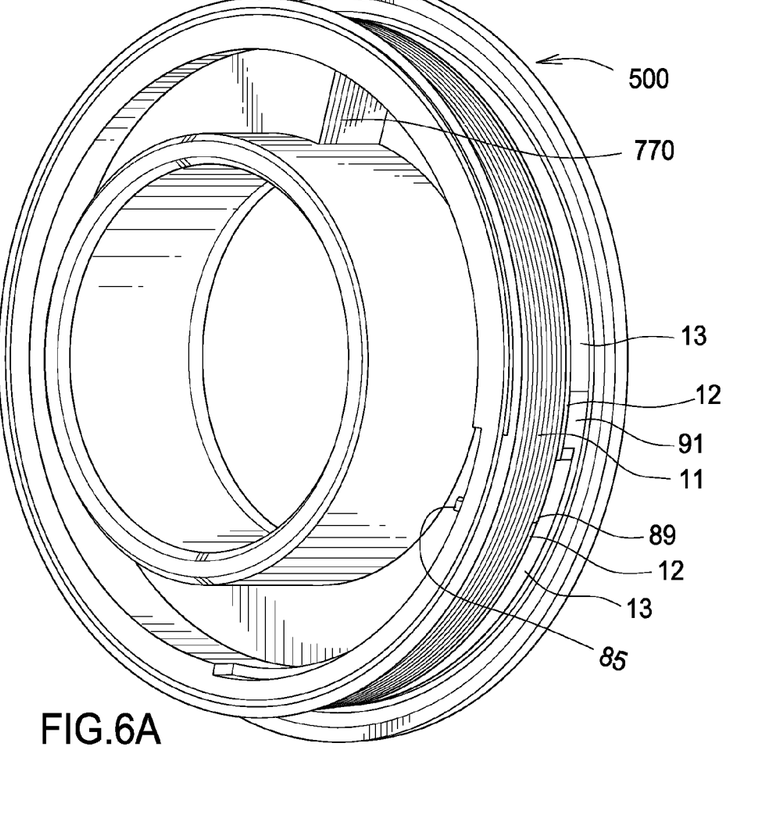
FIG. 6A is a detail of the clutch mechanism.
Figure 6B:
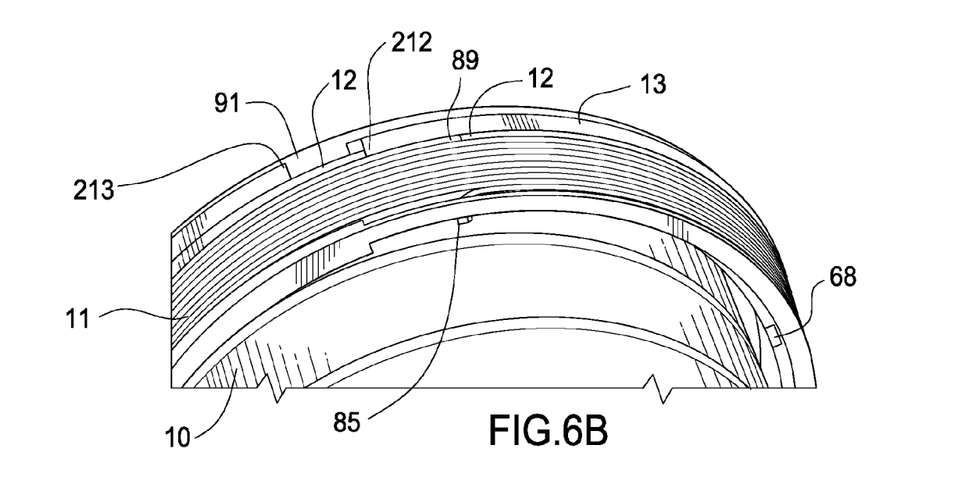
FIG. 6B is a detail of the clutch mechanism.

FIG. 6B is a detail of the clutch mechanism. Carrier 9 engages spring ring 13 at portion 91. The cross-sectional dimension of spring ring 13 is approximately 1.4 mm×1.4 mm. Spring ring 13 comprises less than one full loop, approximately 300 degrees to 360 degrees. Spring ring 13 is loaded by contact with carrier portion 91 at spring ring end 213, see FIG. 6A. The other end 212 of spring ring 13 (output end) has contact with input end 214 of spring ring 12. Spring ring 12 comprises less than one full loop, approximately 300 degrees to 360 degrees.

At end 212 the load between rings 13 and 12 generates torque that is 2 to 2.5 times less than the maximum torque delivered by torsion spring 10 due to its reduced tangential spring rate. This is because friction between spring ring 13 and shaft 1 generates about 8-10 Nm torque. Spring ring 12 in turn reduces the torque from output to input ends an additional 2 to 2.5 times due to its reduced tangential spring rate. At the contact between spring ring end 215 and wrap spring input end 89 there is a compressive force that generates about 2 to 3 Nm torque.

The cross-sectional dimension of spring ring 12 is approximately half that of spring ring 13, with a dimension of approximately 0.7 mm×1.4 mm. The cross-sectional dimension of wrap spring 11 is about 0.5 mm×1.0 mm. Wrap spring 11 has 9 to 10 helical coils, but may have a lesser or greater number depending on the desired operating characteristics. Hence, the tangential spring rate of spring ring 13 is greater than the tangential spring rate of spring ring 12. The tangential spring rate of spring ring 12 is greater than the tangential spring rate of wrap spring 11. Spring ring 13, spring ring 12 and wrap spring 11 are connected in series.

"Tangential spring rate" refers to the spring rate of the spring ring when a force is applied in a tangential direction to each end of the spring ring, coplanar with the spring ring and in opposing directions thereby having the effect of urging the spring ring ends apart.

Figure 7:
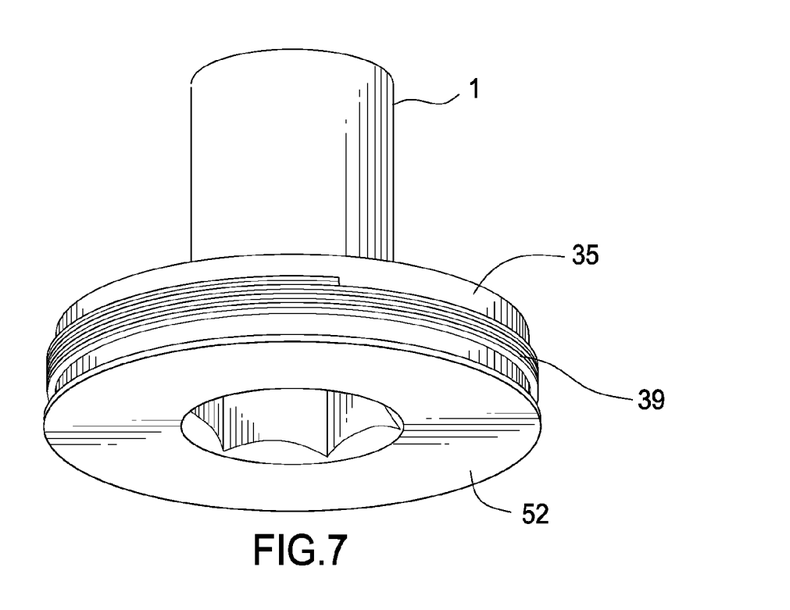
FIG. 7 is a perspective view of the dynamic seal.
Figure 8:
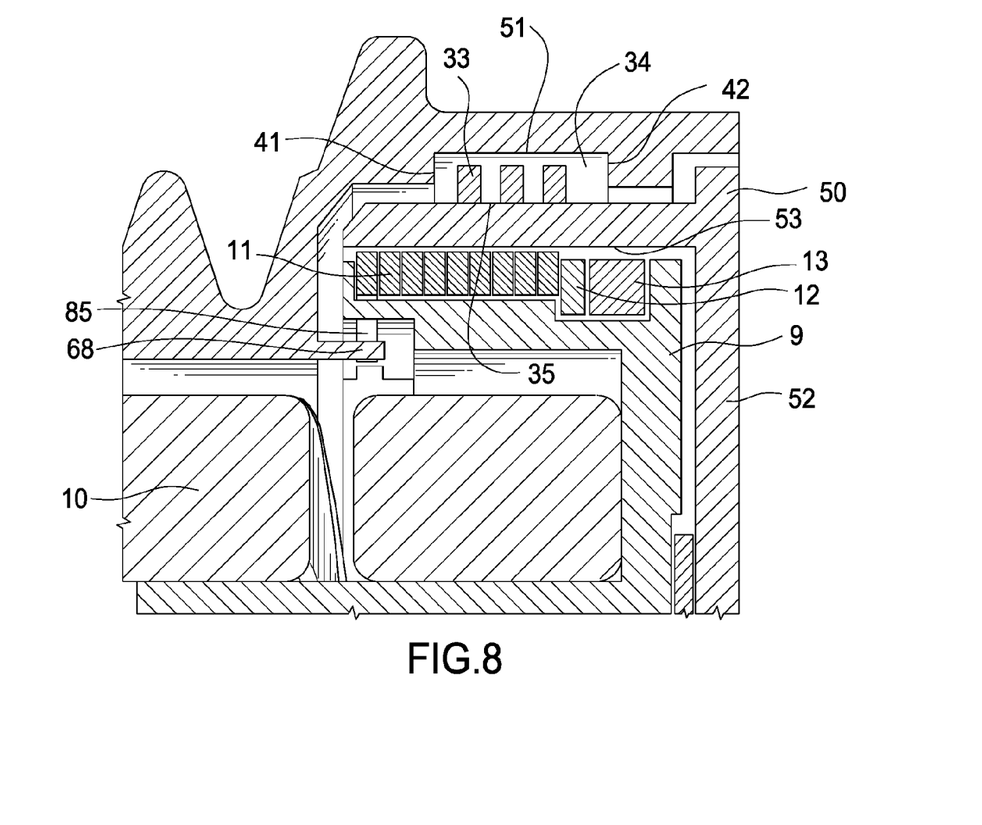
FIG. 8 is a cross-sectional detail of the clutch mechanism.

Dynamic seal 33 is disposed between an inner surface 51 of pulley 2 and an outer surface 35 of portion 50 of shaft 1. FIG. 7 is a perspective view of the dynamic seal. Dynamic seal 33 comprises helical sealing member 39. Pulley 2 comprises a groove 34 with an inner surface 51 and facing surface 41 and surface 42. Sealing member 39 bears upon outer surface 35 of shaft portion 50 between facing surface 41 and facing surface 42.

Helical sealing member 39 comprises a plurality of helical coils. Member 39 comprises a rectangular cross-section with dimensional ratio of about 2:1. This provides relatively greater stiffness in the radial direction with respect to the axis of rotation A-A. The at-rest radius of helical sealing member 39 is less than the radius of surface 35 and so member 39 bears upon surface 35. The ends of helical sealing member 39 contact facing surfaces 41, 42 of groove 34. During operation, when the device is rotating helical sealing member 39 is accelerating. Physics teaches that an object moving in a circle is accelerating, even when under a constant or changing velocity. Under acceleration member 39 radially expands and comes into sealing contact with inner surface 51 of groove 34, while also disengaging from and thereby creating a gap between member 39 and shaft outer surface 35. The radial expansion is possible because the helical coils partially "unwind" under acceleration, thereby increasing the radius of the sealing member. When the inventive device is not rotating, and thereby member 39 is not accelerating, member 39 contracts and thereby disengages from pulley surface 51 and bears upon surface 35.

The sealing member feature is beneficial. First, during operation any friction on any surface of shaft 1 is not desirable, such as occurs between a seal and a sealing surface. Typically the seal and sealing surface are in relative motion. Friction produces heat, wears components, and creates contaminating debris. Disengagement of the seal and sealing surface eliminates friction which would be present if member 39 remained engaged with surface 35. Second, during operation it is desirable to ventilate the internal structure of the decoupler in order to expel wear debris, contamination and other particles. Hence, the device comprises unique moveable sealing which prevents contamination during non-operating conditions and allows cooling ventilation of the device during operation.

Although a form of the invention has been described herein, it will be obvious to those skilled in the art that variations may be made in the construction and relation of parts without departing from the spirit and scope of the invention described herein.

I claim:

1. An isolator decoupler comprising:
a shaft;
a pulley journalled to the shaft;
a torsion spring engaged between the pulley and a carrier, the torsion spring loaded in an unwinding direction;
the carrier engaged with a first spring ring;
the first spring ring engaged in series with a second spring ring;
the second spring ring engaged in series with a wrap spring;
the wrap spring frictionally engagable with a shaft surface;
the first spring ring, the second spring ring and wrap spring each loaded in an unwinding direction; and
a sealing member radially expandable under acceleration to sealingly engage with the pulley, the sealing member engaged with the shaft when not under acceleration.

2. The isolator decoupler as in claim 1, wherein the pulley comprises a member temporarily engagable with an end of the wrap spring such that the magnitude of a frictional engagement between the wrap spring and the shaft is progressively reduced upon an increase in torque applied to the pulley.

3. The isolator decoupler as in claim 1, wherein the sealing member is disposed substantially radially outward from the wrap spring.

4. The isolator decoupler as in claim 1, wherein the sealing member comprises a helical coil.

5. The isolator decoupler as in claim 1, wherein the first spring ring comprises a loop of less than 360 degrees.

6. The isolator decoupler as in claim 5, wherein the second spring ring comprises a loop of less than 360 degrees.

7. The isolator decoupler as in claim 1, wherein the sealing member under acceleration disengages from the shaft.

8. An isolator decoupler comprising:
a shaft;
a pulley journalled to the shaft;
a torsion spring engaged between the pulley and a carrier, the torsion spring loaded in an unwinding direction;
the carrier engaged with a first spring ring;
the first spring ring engaged in series with a second spring ring;
the second spring ring engaged in series with a wrap spring;
the wrap spring frictionally engagable with a shaft surface;

the first spring ring, the second spring ring and wrap spring each loaded in an unwinding direction; and a sealing member radially expands under acceleration to contact the pulley, the sealing member engaged with the shaft when not under acceleration; and the pulley comprises a member temporarily engagable with an end of the wrap spring at a predetermined input torque such that the magnitude of a frictional engagement between the wrap spring and the shaft is progressively reduced upon an increase in the predetermined input torque applied to the pulley.

9. The isolator decoupler as in claim 8, wherein the sealing member comprises a helical coil.

10. The isolator decoupler as in claim 9, wherein the first spring ring comprises a loop of less than 360 degrees.

11. The isolator decoupler as in claim 10, wherein the second spring ring comprises a loop of less than 360 degrees.

12. The isolator decoupler as in claim 8, wherein the sealing member when under acceleration disengages from the shaft.

13. An isolator decoupler comprising:

a shaft;

a pulley journalled to the shaft;

a torsion spring engaged between the pulley and a carrier, the torsion spring loaded in an unwinding direction;

the carrier engaged with a first spring ring;

the first spring ring engaged in series with a second spring ring;

the second spring ring engaged in series with a wrap spring;

the wrap spring frictionally engagable with a shaft surface;

the first spring ring, the second spring ring and wrap spring each loaded in an unwinding direction; and a sealing member radially expands under acceleration to contact the pulley, the sealing member engaged with the shaft when not under acceleration, the sealing member when under acceleration disengages from the shaft; and the pulley comprises a member temporarily engagable with an end of the wrap spring at a predetermined input torque such that the magnitude of a frictional engagement between the wrap spring and the shaft is progressively reduced upon an increase in the predetermined input torque applied to the pulley.

14. The isolator decoupler as in claim 13, wherein the sealing member comprises a helical coil.

15. The isolator decoupler as in claim 13, wherein the first spring ring comprises a loop of less than 360 degrees.

16. The isolator decoupler as in claim 13, wherein the second spring ring comprises a loop of less than 360 degrees.

17. The isolator decoupler as in claim 13, wherein the wrap spring is disposed radially inward of the shaft surface.

18. An isolator decoupler comprising:

a shaft;

a pulley journalled to the shaft;

a torsion spring engaged between the pulley and a one-way clutch mechanism, the torsion spring loaded in an unwinding direction;

the one-way clutch mechanism frictionally engaged with the shaft; and a sealing member radially expandable under acceleration to sealingly engage the pulley and disengage from the shaft, the sealing member engaged with the shaft when not under acceleration.

19. The isolator decoupler as in claim 18, wherein the one-way clutch mechanism comprises:

a carrier engaged with the torsion spring and a first spring ring;

the first spring ring engaged in series with a second spring ring;

the second spring ring engaged in series with a wrap spring;

the wrap spring frictionally engagable with a shaft surface;

the first spring ring, the second spring ring and wrap spring each loaded in an unwinding direction; and the pulley comprises a member temporarily engagable with an end of the wrap spring at a predetermined input torque such that the magnitude of a frictional engagement between the wrap spring and the shaft is progressively reduced upon an increase in the predetermined input torque applied to the pulley.

20. The isolator decoupler as in claim 18, wherein the sealing member comprises a helical coil.

* * * * *